July 31, 1928.
J. W. BISHOP
TOILET SEAT HINGE
Filed Nov. 1, 1926
1,679,202
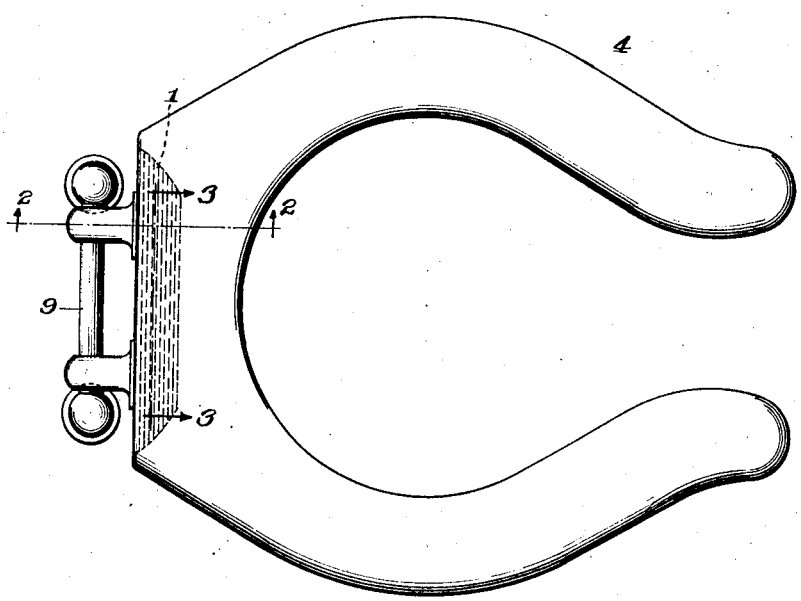
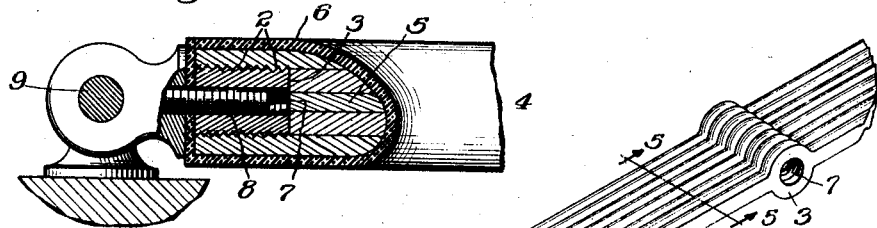
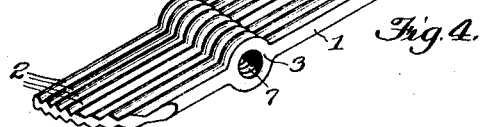
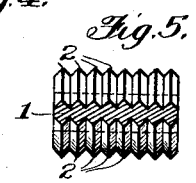
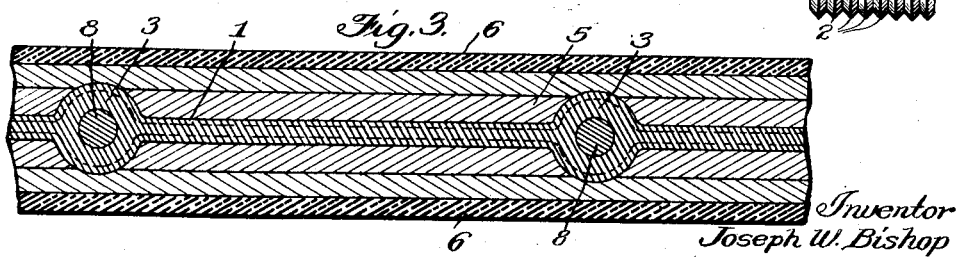
Inventor
Joseph W. Bishop Patented July 31, 1928.

1,679,202

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

TOILET-SEAT HINGE.

Application filed November 1, 1926. Serial No. 145,557.

My invention relates to hinges for toilet seats and has a special relation to means for securing the hinges to the seats.

An object of the invention is to provide an insert embedded in a seat with devices integral therewith for preventing its being dislodged from position by the shocks to which it is subjected by reason of its attachment to a hinge.

Other objects and advantages will appear as the description proceeds.

Referring to the accompanying drawings, Figure 1 is a plan view of a toilet seat and hinge embodying the invention.

Figure 2 is a vertical sectional view taken substantially on the line 2—2 of Fig. 1 showing the seat broken away and illustrating a fragment of a bowl which carries the hinge.

Figure 3 is a sectional view taken on the line 3—3 of Figure 1.

Figure 4 is a detail perspective view of the insert embodied in the structure shown in Figure 1 and Figure 5 is a sectional view on line 5—5 of Fig. 4.

The insert 1 may be flat and has an irregular surface which may be due to ribs or corrugations 2 which may be on both sides of the insert and may extend from end to end thereof.

It may be provided with a plurality of enlargements 3 for purposes to be presently described and the ribs 2 may extend over and about the enlargements.

The insert may be a casting and may be made of malleable iron.

The toilet seat 4 may have a laminated wooden core 5 and its material extends into the irregularities in the surface of the insert. The core may have a coating 6 of hard rubber thereon.

In the process of making the seat a slot may be cut in the core and the insert may be driven therein, the slot being of such shape as to accommodate the enlargements 3. The ribs 2 on the insert bite into the core and hold the insert securely in place.

The rubber coating 6 is then applied and vulcanized under pressure, the pressure operating to further force the material of the core into the grooves between the ribs 2 and to render still more effective the securement of the insert.

The enlargements 3 may then be bored and tapped to provide internal threads 7 and threaded members 8 secured to a hinge 9 in any desired manner may be screwed into the enlargements.

While I have shown and described my invention as embodied in a closet seat having a laminated wood core covered with a veneer of hard rubber vulcanized thereon, I reserve the right to embody the invention in seats of other construction, as for example laminated or solid wood seats as well as seats having a core of relatively inexpensive material and a veneer of hard rubber vulcanized thereto. Furthermore, while my invention is shown in connection with a seat per se it is to be understood that it is equally applicable to the cover which forms a part of the seat in the broader sense of the word and also each part of a seat where the seat is made of two separate portions or wings and the word "seat" as used in the accompanying claims is used in its broader sense so that the application of the invention is not limited to the specific disclosure in the drawing.

The invention is not limited to the other specific details of the construction illustrated and described but may be embodied in diverse modifications thereof. For instance the insert may be made of any of a number of metals.

A substantial range of equivalents is contemplated within the spirit of the invention and scope of the appended claims.

I claim,

1. The combination of a toilet seat, a flat metallic insert embedded therein and having a corrugated surface for preventing displacement thereof, and a hinge secured to said insert.

2. The combination of a toilet seat, a flat metallic insert embedded in the rear portion thereof, ribs on said insert extending transversely of said seat and a hinge secured to said insert.

3. The combination of a toilet seat, a flat metallic insert embedded in the rear portion thereof, ribs on said insert extending transversely of said seat and a hinge for said seat including members threaded into said insert, said insert having enlargements thereon receiving said members.

4. The combination of a toilet seat composed of layers of wood, a flat metallic insert embedded therein and having a corrugated surface for retaining the insert in position and a hinge secured to said insert.

5. The combination with a toilet seat comprising a core of laminated wood and a coating of hard vulcanized rubber thereon, of a flat metallic plate embedded in said core and extending parallel to the laminations thereof and spaced from the inner surfaces of the top and bottom layers of said coating, said plate having a corrugated surface for retaining the same in position and a hinge secured to said insert.

6. The process of securing an insert having an irregular surface, to a toilet seat, which consists in forcing the insert into the seat, compressing the seat to force the material thereof into the irregularities in the insert and applying a hard rubber coating to the seat.

7. The combination with a toilet seat comprising a core of laminated wood and a coating of hardened composition material thereon, of a flat metallic insert in said core adjacent the rear of said seat having a plurality of integral projections extending laterally therefrom and penetrating said core so as to prevent the withdrawal of said insert without simultaneously tearing away a portion of said core.

8. The combination with a toilet seat comprising a core and a coating of hard material thereon, of a relatively flat metallic insert in said core adjacent the rear of said seat having a plurality of integral projections extending laterally therefrom and penetrating said core so as to prevent the withdrawal of said insert without simultaneously tearing away a portion of said core.

JOSEPH W. BISHOP.